(No Model.)

L. C. HUBER.
GRAVE FILLER.

No. 304,647. Patented Sept. 2, 1884.

WITNESSES:

INVENTOR:
Louis C. Huber
By _____ Attorney.

UNITED STATES PATENT OFFICE.

LOUIS C. HUBER, OF HUBER, KENTUCKY.

GRAVE-FILLER.

SPECIFICATION forming part of Letters Patent No. 304,647, dated September 2, 1884.

Application filed May 2, 1884. (No model.)

*To all whom it may concern:*

Be it known that I, LOUIS C. HUBER, of Huber, in the county of Bullitt and State of Kentucky, have invented a new and useful Improvement in Grave-Fillers, which improvement is fully set forth in the following specification and accompanying drawings, in which—

Figure 1:
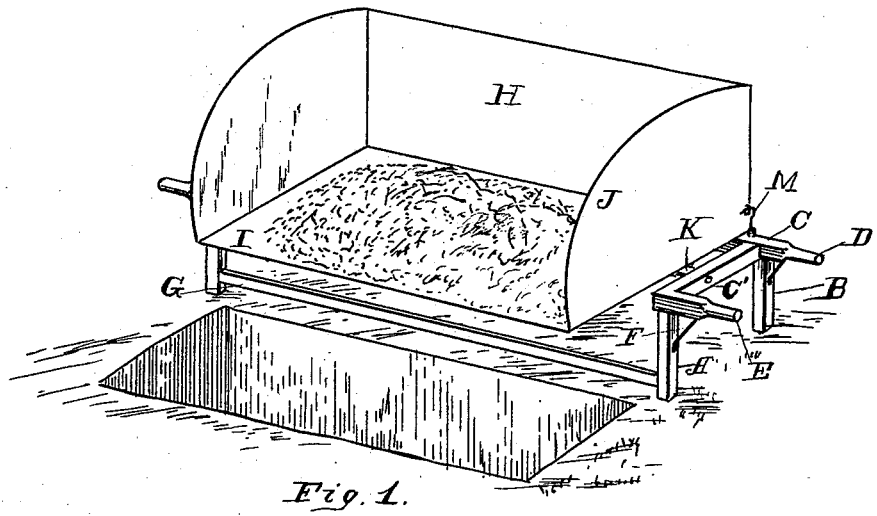
Figure 2:
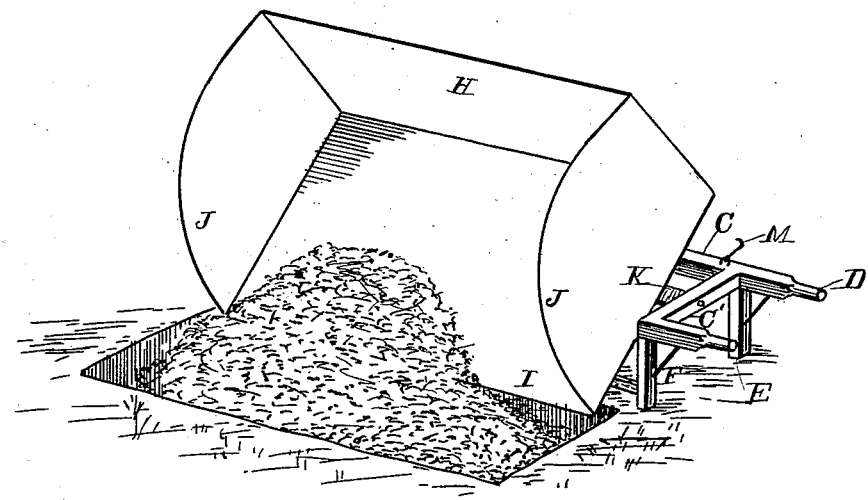

Figure 1 is a perspective view of my improved grave-filler; Fig. 2, a perspective view of the same, showing the method of dumping.

In digging graves in cemeteries the usual method is to throw the loose dirt from the excavation out upon the sod and grass, in which position it both disfigures the sod and requires more or less exertion in again filling into the grave after the coffin is deposited therein. I design to overcome this difficulty by providing a receptacle hinged upon an upright frame, to receive the dirt as it is thrown out of the grave, and when it is desired to fill the said grave it is turned forward, and depositing the dirt within the grave, all of which will now be fully set forth in detail.

In the accompanying drawings, A are the forward upright pieces forming the frame. These are of suitable length. The rear ones, B, have a horizontal piece, C, the ends provided with handles D. To the lower side of each end the upper ends of the posts are framed. These end posts are designed to be about the same distance apart as the length of an ordinary grave, short horizontal pieces C' extending laterally from one side of the piece C immediately above the ends of the posts, and have at their opposite ends the posts A, and outwardly from the ends of these short pieces handles E, parallel with the piece C, are secured. Braces F connect the handles E with the posts, in order to stiffen the same. Between the forward posts, D, and near their lower ends, I provide a connecting-piece, G, framed into the said posts, for the purpose of making the said posts more substantial. I next provide a hinged dumping-box, H, the forward side, I, formed open, and forward side of the ends J somewhat rounded, as shown in the drawings. A longitudinal piece, K, is secured in a substantial manner to the bottom of the dumping-box, and the ends provided with journals, working in corresponding openings in the upper side of the horizontal pieces C'. At any convenient point on the horizontal piece C, I provide a hook, M, which engages with a staple in the dumping-box, when the said box is turned back with the bottom in a horizontal line. In this position the device is placed at the side of the grave and the dirt filled in as the grave is dug. When it is desired to fill the grave, the hook M is released and the dumping-box tipped forward, and the dirt slides into the grave, and thus both time is saved and labor dispensed with in shoveling it back, and the sod and the surroundings of the grave are kept clean.

What I claim is—

1. The herein-described grave-filler, consisting of an upright frame having handles at the ends, upon which is hinged a dumping-box having the forward side open, and provided at the rear side with a hook for securing in position, as and for the purpose substantially as herein set forth.

2. The combination of the upright frame, having handles at the ends and end connecting-pieces, with the dumping-box having the forward side open and the ends rounded, and secured in position by means of a hook, substantially as herein set forth.

In testimony that I claim the foregoing I have hereunto set my hand, this 12th day of April, 1884, in the presence of witnesses.

LOUIS C. HUBER.

Witnesses:
R. S. SHREVE,
T. W. KENNEDY.